United States Patent [19]

Morin et al.

[11] Patent Number: 4,879,128
[45] Date of Patent: Nov. 7, 1989

[54] METHOD OF PRE-COOKING BACON

[75] Inventors: Paul G. Morin, Madison, Wis.; Tommy L. Hoes, Waco, Tex.

[73] Assignee: Oscar Mayer Foods Corporation, Madison, Wis.

[21] Appl. No.: 144,291

[22] Filed: Jan. 15, 1988

[51] Int. Cl.⁴ .................. A23L 1/31; A65B 35/30; A65B 25/08
[52] U.S. Cl. .................. 426/392; 426/420; 426/243; 426/523; 426/124; 426/129; 426/396
[58] Field of Search ............... 426/113, 121, 124, 243, 426/523, 420, 392, 396, 129; 53/440, 447

[56] References Cited

U.S. PATENT DOCUMENTS

| | | | |
|---|---|---|---|
| 2,807,550 | 9/1957 | Zarotschenzeff et al. | 426/113 |
| 2,813,033 | 11/1957 | Schneider | 426/420 |
| 3,113,505 | 12/1963 | Keppler | 426/523 |
| 3,127,828 | 4/1964 | Fine | 426/523 |
| 3,230,864 | 1/1966 | Krajewski | 426/243 |
| 3,321,314 | 5/1967 | Jeppson | 426/243 |
| 3,361,576 | 1/1968 | Jacobson | 426/107 |
| 3,415,662 | 12/1968 | Koger et al. | 426/113 |
| 3,424,596 | 1/1969 | Sullivan | 426/113 |
| 3,429,713 | 2/1969 | Nelson | 426/243 |
| 3,532,511 | 10/1970 | Binkerd et al. | 426/243 |
| 3,597,238 | 8/1971 | Scharre | 426/113 |
| 3,613,554 | 10/1971 | Koger et al. | 426/523 |
| 3,613,555 | 10/1971 | Ogman | 426/523 |
| 3,619,215 | 11/1971 | Bard et al. | 99/174 |
| 3,640,209 | 2/1972 | Wilson | 426/113 |
| 3,715,218 | 2/1973 | Feely | 99/174 |
| 3,861,576 | 1/1975 | Tolaas et al. | 426/113 |
| 3,906,115 | 9/1975 | Jeppson | 426/243 |
| 3,916,030 | 10/1975 | Bard et al. | 426/113 |
| 3,978,642 | 9/1976 | Smithers | 53/159 |
| 4,002,773 | 1/1977 | Entenmann | 426/113 |
| 4,020,614 | 5/1977 | Smithers | 53/26 |
| 4,065,583 | 12/1977 | Ahlgren | 426/107 |
| 4,141,487 | 2/1979 | Faust et al. | 426/113 |
| 4,260,060 | 4/1981 | Faller | 426/113 |
| 4,419,373 | 12/1983 | Oppermann | 426/234 |
| 4,427,706 | 1/1984 | El-Hag | 426/243 |
| 4,590,349 | 5/1986 | Brown et al. | 426/113 |
| 4,603,052 | 7/1986 | El-Haig et al. | 426/523 |
| 4,720,410 | 1/1988 | Lundquist et al. | 426/107 |

FOREIGN PATENT DOCUMENTS 2561874 10/1985 France .................. 426/523

Primary Examiner—Steven Weinstein
Attorney, Agent, or Firm—Joseph T. Harcarik

[57] ABSTRACT

A method of packaging pre-cooking bacon wherein uncooked bacon is sliced onto a greaseproof, interleaving paper in a single-layer arrangement. The bacon is then cooked on the interleaving paper to a bacon yield of 25% to 40%. The interleaving paper with cooked bacon is then stacked, optionally cooled, and packaged for distribution. The interleaving paper has a multiplicity of holes, with the hole diameters between 0.07 inches to 0.20 inches and the center line between the holes of 0.3 inches to 1.25 inches. The paper has a minimum weight of 25 pounds and a greaseproofness rating of 600 or better.

8 Claims, 1 Drawing Sheet

METHOD OF PRE-COOKING BACON

BACKGROUND OF THE INVENTION

1. FIELD OF THE INVENTION

This invention pertains to a method of pre cooking bacon by placing bacon in a single layer on perforated greaseproof interleaving paper.

2. DESCRIPTION OF THE PRIOR ART

In the past, pre-cooked bacon has been prepared by slicing bacon into single layers onto an oven belt which is conveyed to a heater, such as a microwave oven, wherein the bacon is cooked to a yield of approximately 30 to 40 percent. Cooking the bacon produces large quantities of bacon grease. The precooked bacon is conveyed out of the heater and is cooled to ambient temperatures suitable by employing ambient air chillers such as Heco Modulars available from the Enersyst Company. The bacon slices may optionally be refrigerated to 35° F. Because the bacon has been cooked on an oven belt, which retains large amounts of grease on its surface, it is necessary before packing to remove the bacon from the belt it was cooked on and put it on to grease-free, interleaving paper. Such a step is done manually with workers removing the slices from the cooking belt with spatulas and transferring the cooked bacon to interleaving paper. After this has occurred, the bacon on interleaving paper is stacked and vacuum packed for shipment.

Methods of packing bacon have been described in the prior art and the following are representative examples of patents dealing with bacon packaging.

U.S. Pat. No. 3,978,642 (Smithers)

A method of packaging bacon by forming a plastic roll of film and placing slices on bacon on the plastic roll parallel to the axis of the roll. The film and bacon are then stacked in a box. The film itself is preferably heat resistant thereby allowing the consumer to cook the bacon by placing the bacon and film on a grill. The film is not perforated and there is no disclosure of cooking the bacon prior to packaging.

U.S. Pat. No. 4,020,614 (Smithers)

This patent is an improvement over the earlier Smithers patent cited above. Among other things, the improvements include perforations across the paper which help the operator to sever the roll of paper into sheets, as well as the provision of a special forked tool for the operator to aid in stacking. The same heat-resistant film may be used in this method as was used in the Smithers patent above.

U.S. Pat. Nos. 3,619,215 and 3,916,030 (Bard et al.)

A process of shipping and displaying prefried bacon in a disposable heatable tray. The bacon is prefried and then placed on this disposable, heatable tray. The tray includes a sheet material capable of retaining melted fat or greasy liquid. The sheet material has score lines which aid in folding the sheet material over the bacon. The sheet material causes the bacon grease to pool in the nonporous container. The sheet material does not include small holes to allow the grease to flow through.

U.S. Pat. No. 4,603,052 (El-Haig et al.)

A disposable tray for consumer cooking of fried foods which has troughs to collect the oil released upon frying. The food to be cooked is typically frozen and raw and, therefore, not precooked before it reaches the consumer. The food is supported on raised ridges having troughs therebetween which collect the oil released by the product during cooking.

U.S. Pat. No. 3,715,218 (Feely)

An open faced container which can be used to cook bacon is disclosed. The container consists of several trays formed of thin, non toxic metal having a generally flat central part which is ridged to provide rigidity and which is surrounded by a peripheral bead. Bacon slices are placed on the tray within the bead in raw or partially cooked form. The bead serves to provide a means for stacking trays one on another without damaging the bacon strips. Upon cooking, the bead also serves to confine the liquid fat produced by cooking on the tray.

SUMMARY OF THE INVENTION

Figure 1:
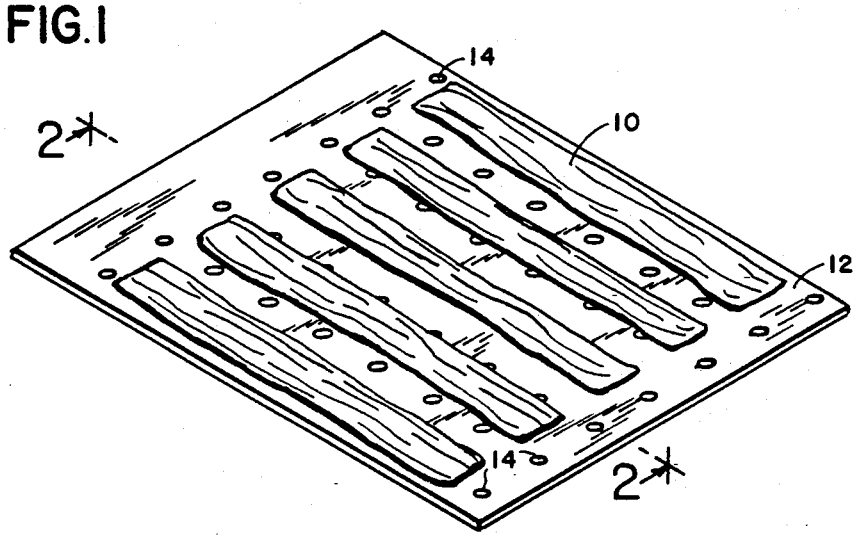
FIG. 1 is a schematic representation showing slices of bacon on an interleaving, greaseproof paper employing a multiplicity of holes.
Figure 2:
FIG. 2 is cross-sectional view of FIG. 1.
Figure 3:
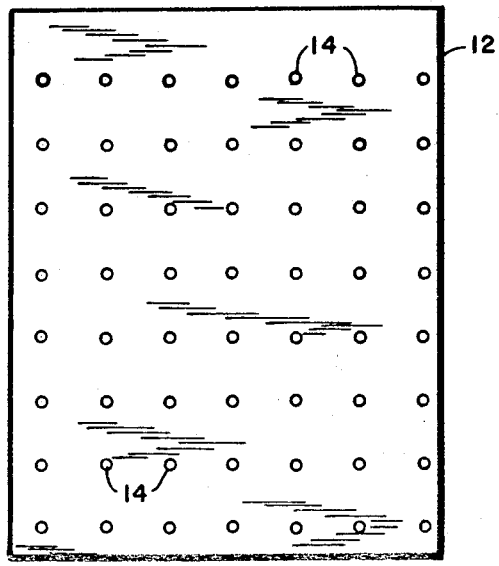
FIG. 3 is a schematic view of interleaving greaseproof paper having a multiplicity of holes.

This invention pertains to a method of pre-cooking bacon wherein the bacon is first sliced and placed in single layers onto greaseproof, interleaving paper. The bacon is cooked on the interleaving paper to a bacon yield of 25 percent to about 40 percent. Next, the bacon is cooled, stacked and packaged on the interleaving paper on which it was cooked. The interleaving paper has a multiplicity of holes with a hole diameter between 0.07 inches to 0.20 inches and the hole center lines range between 0.3 inches to 1.25 inches. The paper has a minimum weight of 25 pounds and a greaseproofness rating of 600 or better.

DETAILED DESCRIPTION OF THE INVENTION

According to the invention, bacon slabs are first sliced into bacon slices employing conventional slicing equipment, such as a Groto Slicers, available from the Groto Company, and slicing the bacon into conventional sizes of approximately 7 inches to 9 inches length, 1 inch to 2 inches width and 0.066 inches to 0.091 inches thicknesses. The bacon is typically sliced onto perforated greaseproof, interleaving paper and the bacon is sliced onto the paper in a single-layer pattern.

The paper is critical to this invention. Suitably, the interleaving paper has a length of approximately 10 inches to 24 inches, and a width of approximately 7 inches to 12 inches, and a weight of at least 25 pounds. The paper must have a greaseproofness rating of 600 or better as determined by TAPPI Standard Test Method T-425. It is also desirable for the paper to have proper opacity and color. Suitable papers have an opacity of a minimum 60%, as determined by a Macbeth spectrophotometer, a color, as determined also by Macbeth spectrophotometer, having an L value minimum 90, an A-value minimum −1.7, a B value minimum 1.5, and a yellowness index maximum 2.

Furthermore, the interleaving paper must have a multiplicity of holes. The hole size diameter must range from a minimum of 0.07 inches to a maximum of 0.20 inches. The centerline distances between the hole size must range from a minimum distance of 0.3 inches to a maximum distance of 1.25 inches. Furthermore, when a smaller hole size is employed, that is a hole size of 0.07 inches, the maximum distance is 1.0 inches. Therefore, for hole sizes ranging between 0.07 to 0.2 inches the maximum distance ranges from 1 inch to 1.25 inches and is proportional in between.

It is found that when this type of paper is employed suitable drainage of the bacon grease occurs and, furthermore, upon subsequent stacking of the interleaving paper the bacon does not significantly contact the bacon on an upper or lower sheet causing sufficient sticking of the bacon to subsequent damage to the bacon. For example, it has been found that if hole sizes less than 0.07 inches are employed, or if center line distances greater than 1.25 inches are employed, there will be inadequate drainage of the grease and the benefits of this invention will not be obtained. Furthermore, if hole sizes above 0.2 inches are employed or, if distances below 0.3 inches are used, then the bacon will be substantially exposed to the bacon on an upper or lower stacking and will stick and subsequently be damaged whenever the interleaving papers are attempted to be separated.

After the sliced bacon has been placed on interleaving paper in the above identified manner, it is then cooked by any conventional cooking means such as by microwaving to a yield of 25% to about 40% and preferably to a yield of 35% to 40%. After the cooking the product is then transferred to a chilling station wherein the bacon is chilled to a temperature of approximately 70° F. to 80° F. The chilled bacon may subsequently be refrigerated or frozen to temperatures of approximately −40° F. to 50° F. and preferably to 0° F. to 35° F. After cooling, the bacon on the interleaving paper is then stacked. Suitably, the stacking as at least 2 layers high and maybe as high as 20 layers high. The product may then be vacuum packed by employing standard vacuum packing techniques and then distributed.

The figures show bacon slices (10) with interleaving paper (12) having a multiplicity of holes (14).

We claim:

1. A method for packaging bacon comprising the steps of placing on sheets of greaseproof interleaving paper a plurality of bacon slices so that a plurality of bacon slices are placed in a single layer on each of said sheets, cooking said bacon slices on said sheets of interleaving paper, said bacon cooked on said interleaving paper to a bacon yield of 25% to 40%, then stacking said sheets of interleaving paper with said cooked bacon thereon so that said cooked bacon is between each of said sheets; and then packaging said stack of sheets of interleaving paper and said cooked bacon slices therebetween; said interleaving paper having a multiplicity of holes with a hole size diameter range from between 0.07 inches to 0.02 inches and with a centerline distance between the holes range from between 0.3 inches to 1.25 inches, said paper having a minimum weight of 25 pounds and a grease proofness rating of 600 or greater.

2. A method according to claim 1 wherein the paper has a base weight of at least 35 pounds.

3. A method according to claim 1 wherein the paper has an opacity rating of a maximum 60%, a color L-value minimum 90, an A-value minimum −1.7, B-value maximum 1.5 and yellowness index maximum 2.

4. A method according to claim 1 wherein each of the sheets of interleaving paper have a length of 10 to 24 inches and a width of 7 to 12 inches.

5. A method according to claim 1 wherein the stacked packaged bacon is vacuum-packed.

6. A method according to claim 1 wherein each slice of bacon has a length of 7 to 9 inches, a width of 1 to 2 inches and a thickness of 0.066 inches to 0.091 inches.

7. A method according to claim 1 further comprising cooling the cooked bacon before packaging.

8. A method according to claim 1 wherein the cooled bacon is chilled before packaging.

* * * * *